(12) United States Patent
Hirata et al.

(10) Patent No.: US 10,844,809 B2
(45) Date of Patent: Nov. 24, 2020

(54) ENGINE (71) Applicant: MAZDA MOTOR CORPORATION, Hiroshima (JP)

(72) Inventors: Toshihiko Hirata, Hiroshima (JP); Keita Sakamoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/490,455

(22) PCT Filed: Feb. 8, 2018

(86) PCT No.: PCT/JP2018/004468
§ 371 (c)(1),
(2) Date: Aug. 30, 2019

(87) PCT Pub. No.: WO2018/173537
PCT Pub. Date: Sep. 27, 2018

(65) Prior Publication Data
US 2020/0018264 A1 Jan. 16, 2020

(30) Foreign Application Priority Data
Mar. 22, 2017 (JP) ................................ 2017-056473

(51) Int. Cl.
*F02M 25/08* (2006.01)
*F02M 35/10* (2006.01)
(Continued)

(52) U.S. Cl.
CPC ...... *F02M 25/08* (2013.01); *F02M 35/10078* (2013.01); *F02M 35/10157* (2013.01);
(Continued)

(58) Field of Classification Search
CPC ............. F02M 25/08; F02M 35/10078; F02M 35/10216; F02M 35/10157; F02M 35/161; F02M 2200/185; F02B 37/16
See application file for complete search history.

(56) References Cited

U.S. PATENT DOCUMENTS 5,347,971 A * 9/1994 Kobayashi ......... F02M 25/0809
123/198 D
5,572,980 A * 11/1996 Nakagawa ............ F02D 41/004
123/520
(Continued)

FOREIGN PATENT DOCUMENTS

EP 1329621 A2 7/2003
JP H11-210573 A 8/1999
(Continued)

OTHER PUBLICATIONS

International Search Report issued in PCT/JP2018/004468; dated Apr. 3, 2018.
(Continued)

*Primary Examiner* — Hieu T Vo
(74) *Attorney, Agent, or Firm* — Studebaker & Brackett PC (57) ABSTRACT

An engine includes fuel system components provided on a cylinder head, a purge control valve that controls an amount of evaporated fuel purged to a portion of an intake passage on a downstream side of a throttle valve, and intake pipes that form the portion of the intake passage on the downstream side of the throttle valve and extend in a cylinder array direction, in which the purge control valve is disposed in front of the intake pipes and the fuel system components are disposed on an opposite side of the purge control valve across the intake pipes in vehicle front view or vehicle side view.

12 Claims, 6 Drawing Sheets (51) Int. Cl.
      *F02M 35/16*       (2006.01)
      *F02B 37/16*       (2006.01)
(52) U.S. Cl.
      CPC ........ *F02B 37/16* (2013.01); *F02M 35/10216* (2013.01); *F02M 35/161* (2013.01); *F02M 2200/185* (2013.01)

(56) References Cited

U.S. PATENT DOCUMENTS

2016/0061166 A1    3/2016  Tanaka et al.
2016/0177853 A1    6/2016  Uhrich et al.

FOREIGN PATENT DOCUMENTS

JP    2005-090429 A    4/2005
JP    2006-242045 A    9/2006
JP    2016-053319 A    4/2016
JP    2016-102431 A    6/2016
WO    2014/068825 A1   5/2014

OTHER PUBLICATIONS

The extended European search report issued by the European Patent Office dated Feb. 12, 2020, which corresponds to European Patent Application No. 18770616.3-1004 and is related to U.S. Appl. No. 16/490,455.

* cited by examiner

ENGINE

BACKGROUND

Technical Field

The present disclosure relates to an engine for vehicles and, more particularly, to a disposition structure of a purge control valve.

Background Art

Generally, evaporated fuel generated in a fuel tank is absorbed by a canister and the evaporated fuel is purged from the canister to an intake passage of an engine during operation of the engine by a purge control valve.

In JP-A-2005-90429, the purge control valve is disposed closer to a throttle body by providing an intercooler in front of the throttle body and providing this intercooler with the purge control valve.

In JP-A-2016-133114, a bypass pipe that bypasses a mechanical supercharger is provided in an intake passage having the mechanical supercharger.

SUMMARY

By the way, fuel system components such as a common rail for supplying fuel and a fuel pipe connecting the common rail to a fuel injection valve are disposed on a cylinder head of an engine. When other engine components are disposed in front of such fuel system components, even if the engine components are pushed backward or removed and fly off during a front collision of the vehicle, it is necessary to prevent the engine components from hitting and damaging the fuel system components. Even when the engine components are disposed on the side of the fuel system components, it is also necessary to prevent the engine components from damaging the fuel system components during a side collision of the vehicle.

The purge control valve as an engine component is preferably disposed close to the intake passage to responsively supply evaporated fuel to the intake passage by the operation thereof. In this case, the purge control valve is disposed in a position in the vicinity of an upper portion of the engine. In this case, it is also necessary to prevent the purge control valve from damaging the fuel system components during the collision of the vehicle described above.

That is, the present disclosure relates to disposition of a purge control valve and prevents the purge control valve from damaging fuel system components during the collision of the vehicle while improving the response of purge control.

Accordingly, the present disclosure uses an intake pipe that forms a portion of the intake passage on a downstream side of a throttle valve to prevent the purge control valve from damaging the fuel system component during a collision of the vehicle.

An engine disclosed here includes a fuel system component provided on a cylinder head; a purge control valve that controls an amount of evaporated fuel purged from a canister to a portion of an intake passage on a downstream side of a throttle valve; and an intake pipe that forms the portion of the intake passage on the downstream side of the throttle valve, the intake pipe extending in a cylinder array direction, in which the purge control valve is disposed in front of the intake pipe and the fuel system component is disposed on an opposite side of the purge control valve across the intake pipe in vehicle front view or vehicle side view.

The fact that the purge control valve is disposed in front of the intake pipe that forms the portion of the intake passage on the downstream side of the throttle valve means that the purge control valve is brought closer to the intake pipe in an up-down direction. Accordingly, this is advantageous to responsively supply evaporated fuel to the intake passage due to the operation of the purge control valve.

That fact that the purge control valve is disposed in front of the intake pipe and the fuel system component is disposed on the opposite side of the purge control valve across the intake pipe in the vehicle front view or the vehicle side view means that the purge control valve faces the fuel system component across the intake pipe in a vehicle collision direction. In other words, the intake pipe is present between the purge control valve and the fuel system component. Accordingly, even when the purge control valve is detached due to the collision of the vehicle, the purge control valve is prevented from colliding with the fuel system component due to the presence of the intake pipe. Alternatively, even when the purge control valve is pushed toward the fuel system component due to the collision of the vehicle, the intake pipe functions as a cushion and prevents the fuel system component from being damaged.

In a preferable embodiment, the intake pipe that forms the portion of the intake passage on the downstream side of the throttle valve includes a main air intake pipe that is connected to a supercharger and extends in the cylinder array direction and a bypass air intake pipe that branches from the main air intake pipe so as to bypass the supercharger and extends in the cylinder array direction, the bypass air intake pipe extends in the cylinder array direction above the main air intake pipe, and the purge control valve is provided so as to purge the evaporated fuel into the main air intake pipe.

Therefore, since the bypass air intake pipe is provided above the main air intake pipe, the bypass air intake pipe surely prevents the fuel system component from being damaged by the purge control valve during the collision of the vehicle.

In a preferable embodiment, an evaporated fuel vapor inlet related to the purge control valve is opened in a portion of the main air intake pipe on an upstream side of the supercharger and the bypass air intake pipe branches from a portion of the main air intake pipe on the upstream side of the evaporated fuel vapor inlet and is connected to the main air intake pipe on the downstream side of the supercharger.

Therefore, the suction force of intake air by the supercharger can be used to purge the evaporated fuel, so desired purge efficiency can be obtained even when the throttle valve is fully open.

In a preferable embodiment, the evaporated fuel vapor inlet is opened in an upper portion of the intake pipe that forms the portion of the intake passage on the downstream side of the throttle valve. Therefore, even when foreign matter enters the intake passage, the foreign matter hardly enters the purge control valve, thereby being advantageous for prevention of clogging of the purge control valve.

In a preferable embodiment, the purge control valve has an outflow connection pipe projecting from a valve body and the outflow connection pipe is directly connected to the intake pipe that forms the portion of the intake passage on the downstream side of the throttle valve. Therefore, a hose for connecting the purge control valve to the intake pipe is unnecessary and the evaporated fuel can be responsively supplied to the intake passage by the operation of the purge control valve.

According to the present disclosure, the engine includes the fuel system component provided on the cylinder head, the purge control valve, and the intake pipe that forms the portion of the intake passage on the downstream side of the throttle valve and extends in the cylinder array direction, in which the purge control valve is disposed in front of the intake pipe and the fuel system component is disposed on an opposite side of the purge control valve across the intake pipe in vehicle front view or vehicle side view, so it is possible to prevent the purge control valve from damaging the fuel system component during the collision of the vehicle while improving the response of the purge control valve.

DETAILED DESCRIPTION

Embodiments for achieving the present disclosure will be described below with reference to the drawings.

Description of the preferable embodiments below is only an example and does not intend to limit the present disclosure, an object to which the present disclosure has been applied, and the use of the present disclosure.

Figure 1:
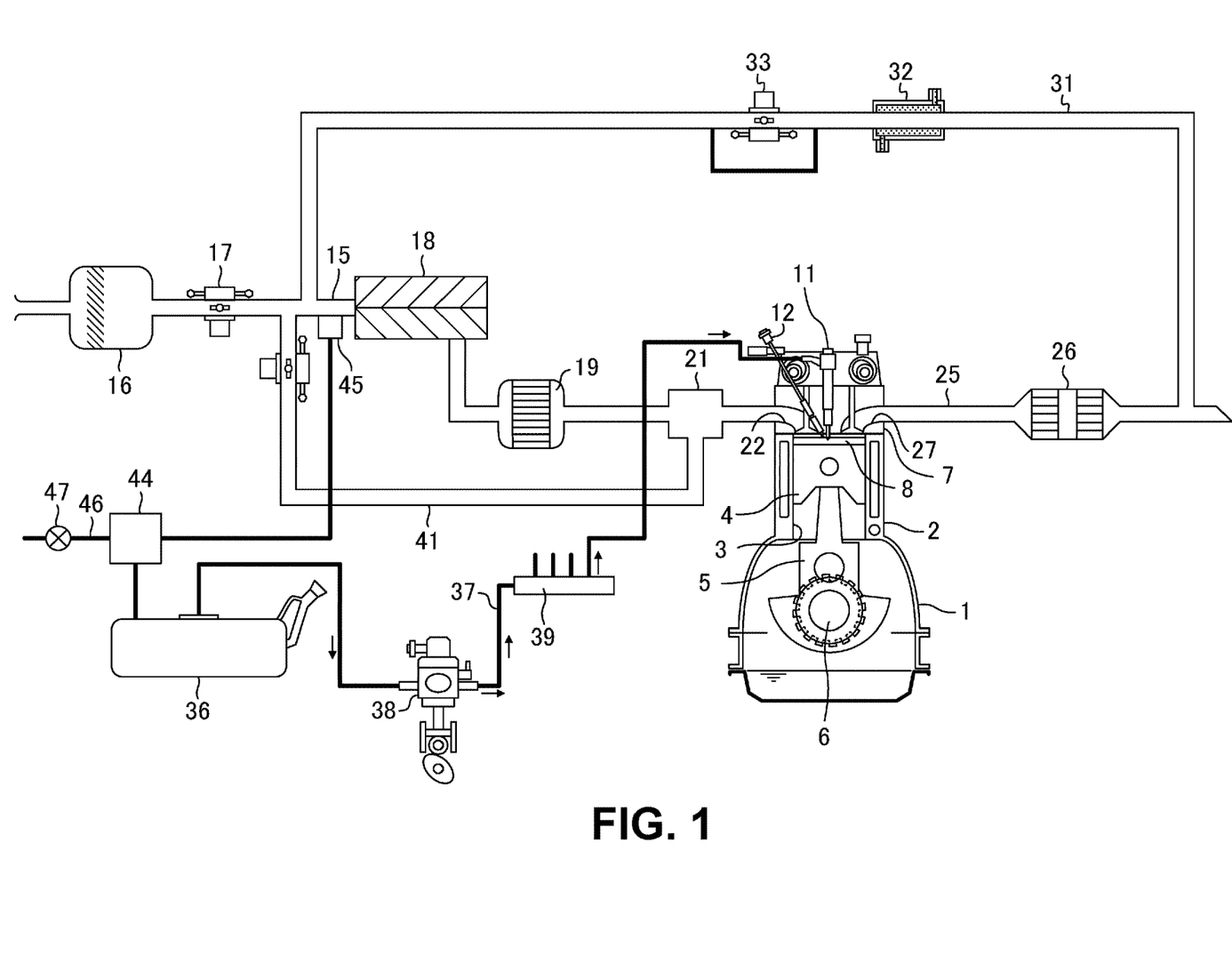
FIG. 1 is an entire structural diagram illustrating an engine.

In FIG. 1, reference numeral 1 represents a gasoline engine for a vehicle and a plurality of cylinders 3 is formed in a cylinder block 2 thereof. Although only one of the cylinders 3 is illustrated in FIG. 1, the engine 1 is a multi-cylinder engine. Pistons 4 are slidably inserted into the cylinders 3. The pistons 4 are joined to a crankshaft 6 via connecting rods 5. The pistons 4 define combustion chambers 8 together with the cylinders 3 and a cylinder head 7. A direct-injection fuel injection valve 11 and an ignition plug 12 are attached to the cylinder head 7 for each of the cylinders 3.

In an intake passage 15 of the engine 1, an air cleaner 16, a throttle valve 17, a supercharger 18, an intercooler 19, and a surge tank 21 are disposed in this order from the upstream side to the downstream side. The portion of the intake passage 15 on the downstream side of the surge tank 21 is formed by an intake manifold and the downstream end of an independent passage that branches for each of the cylinders 3 is connected to an inlet 22 of each of the cylinders 3.

In this example, the supercharger 18 is a mechanical supercharger driven by the engine 1. The type of the mechanical supercharger may be, for example, root type, lysholm type, or centrifugal type, although the disclosure is not limited to these types.

In an exhaust passage 25 of the engine 1, an exhaust gas purification system having one or more catalyst converter 26 is provided. The catalyst converter 26 includes a three-way catalyst. It should be noted here that the exhaust gas purification system is not limited to one including only a three-way catalyst. The upstream end part of the exhaust passage 25 is formed by an exhaust air manifold and the upstream end of an independent passage that branches for each of the cylinders 3 is connected to an outlet 27 of each of the cylinders 3.

The intake passage 15 is connected to the exhaust passage 25 via an EGR passage 31 that forms an external EGR system. The EGR passage 31 returns a part of burnt gas from the exhaust passage 25 to the intake passage 15. The upstream end of the EGR passage 31 is connected to a portion of the exhaust passage 25 on the downstream side of the catalyst converter 26. The downstream end of the EGR passage 31 is connected to a portion of the intake passage 15 on the upstream side of the supercharger 18. In the EGR passage 31, a water-cooled EGR cooler 32 that cools burnt gas and an EGR valve 33 that adjusts the backflow amount of burnt gas are disposed.

A fuel supply system 35 is connected to the fuel injection valve 11. The fuel supply system 35 includes a fuel supply path 37 that connects the fuel injection valve 11 and a fuel tank 36 to each other. In the fuel supply path 37, a fuel pump 38 and a common rail (fuel rail) 39 are provided. In this structural example, the fuel pump 38 is of plunger type that is driven by the crankshaft 6. The common rail 39 stores, at a high fuel pressure, the fuel pumped from the fuel pump 38.

A bypass passage 41 bypasses the supercharger 18 and the intercooler 19 is connected to the intake passage 15. That is, the upstream end of the bypass passage 41 is connected to a portion of the intake passage 15 between the throttle valve 17 and the supercharger 18 and the downstream end of the bypass passage 41 is connected to the surge tank 21. The bypass passage 41 is provided with a bypass valve 42 that adjusts the passage opening thereof.

One end of a purge passage 43 through which evaporated fuel (evaporated gas) generated in the fuel tank 36 is released to the intake passage 15 is connected to the fuel tank 36. The other end of this purge passage 43 is connected to a portion of the intake passage 15 on the upstream side of the supercharger 18 and on the downstream side of the upstream end of the bypass passage 41. In the purge passage 43, a canister 44 that absorbs and stores the evaporated fuel and a purge control valve 45 that adjusts the supply amount (to the intake passage 15) of the evaporated fuel absorbed by the canister 44 are provided. An outside air introduction passage 46 through which outside air is introduced is connected to the canister 44. This air release passage 46 is provided with an outside air introduction valve 47 that controls the introduction amount of outside air to the canister 44.

<Disposition Structure of Intake Pipes, Fuel System Components, Purge Control Valve, and the Like>

Figure 2:
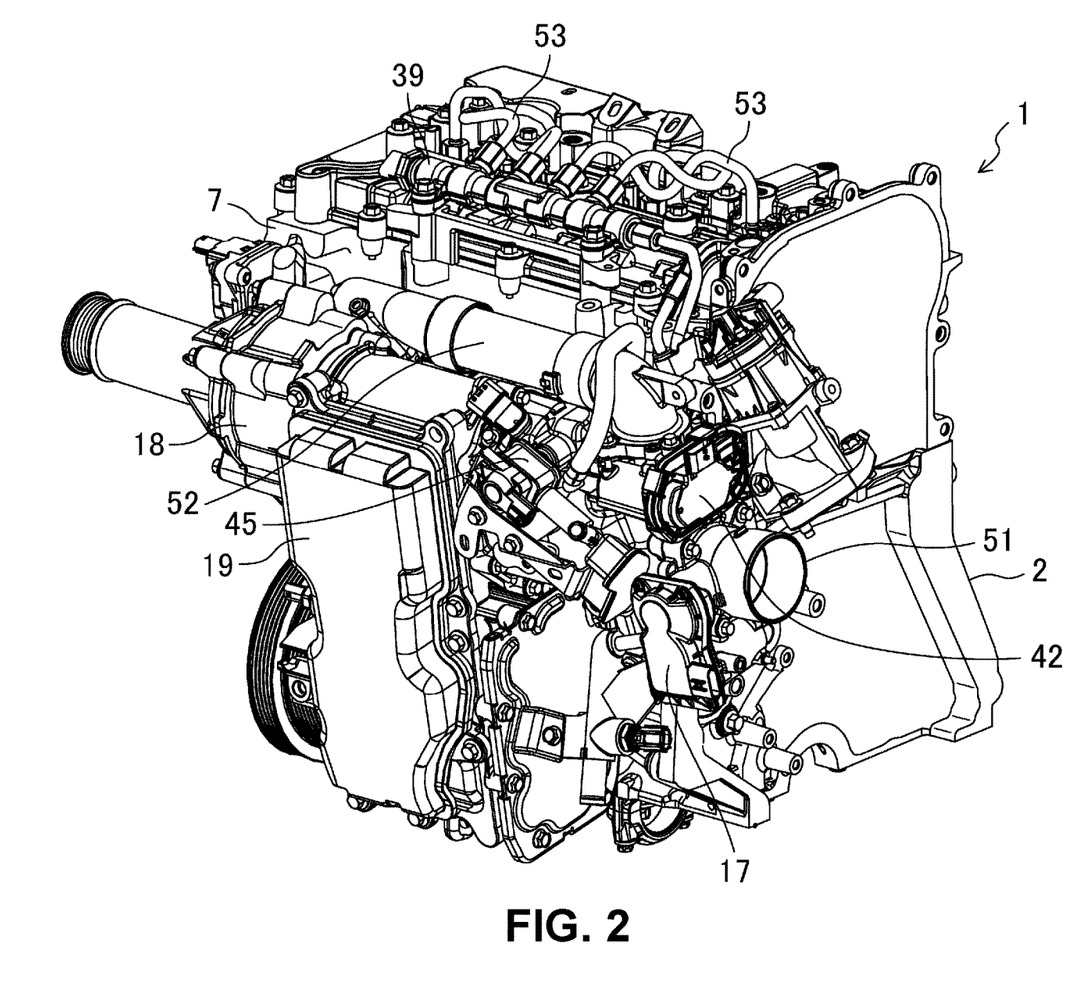
FIG. 2 is a perspective view illustrating the disposition structure of intake pipes, fuel system components, a purge control valve of the engine.

As illustrated in FIG. 2, the engine 1 is a front intake rear exhaust engine and is provided with a bypass air intake pipe 52 and a main air intake pipe 51 constituting a portion of the intake passage 15 on the downstream side of the throttle valve 17 on the front side in a front-rear direction of the vehicle. The purge control valve 45 is connected to the main air intake pipe 51. The common rail 39 is disposed on the cylinder head 7 and fuel supply pipes 53 branching from the common rail 39 are connected to the fuel injection valves 11 of the cylinders illustrated in FIG. 1.

Figure 3:
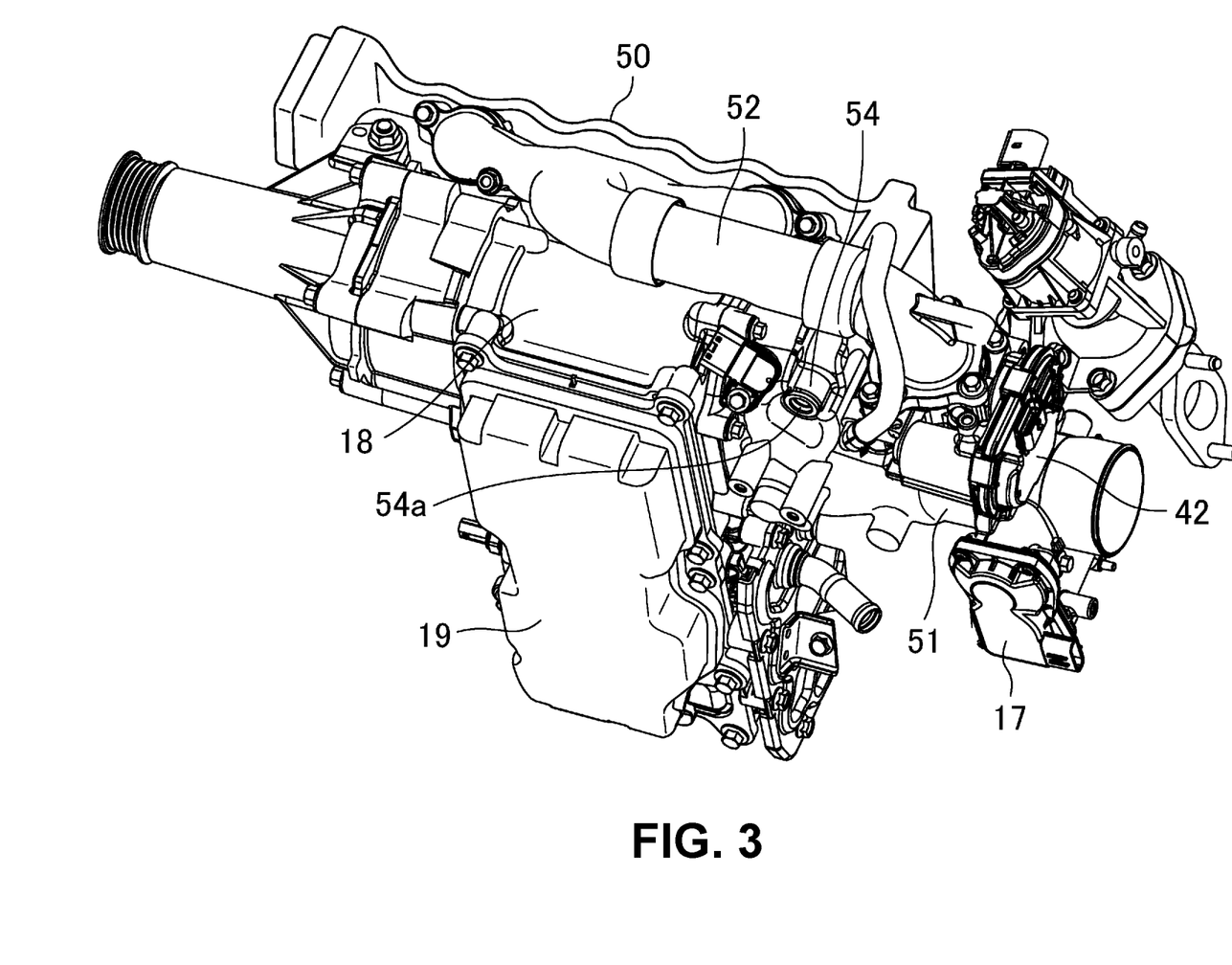
FIG. 3 is a perspective view illustrating intake system components of the engine.

As illustrated in FIG. 3, the main air intake pipe 51 extends in a cylinder array direction from one end side in the cylinder array direction toward the middle side on the side portion of the engine 1 and the downstream end thereof is connected to the supercharger 18 disposed in the middle portion in the cylinder array direction. The bypass air intake pipe 52 branches from the main air intake pipe 51 on the one end side in the cylinder array direction and extends toward the middle side in the cylinder array direction above the main air intake pipe 51 and the supercharger 18 so as to bypass the supercharger 18 to form the bypass passage 41. The downstream portion of the bypass air intake pipe 52 is bifurcated and connected to an intake manifold 50.

A connection portion 54 having a connection port 54a to which the purge control valve 45 is connected is provided in a portion of the main air intake pipe 51 on the downstream side of the branch portion of the bypass air intake pipe 52.

Figure 4:
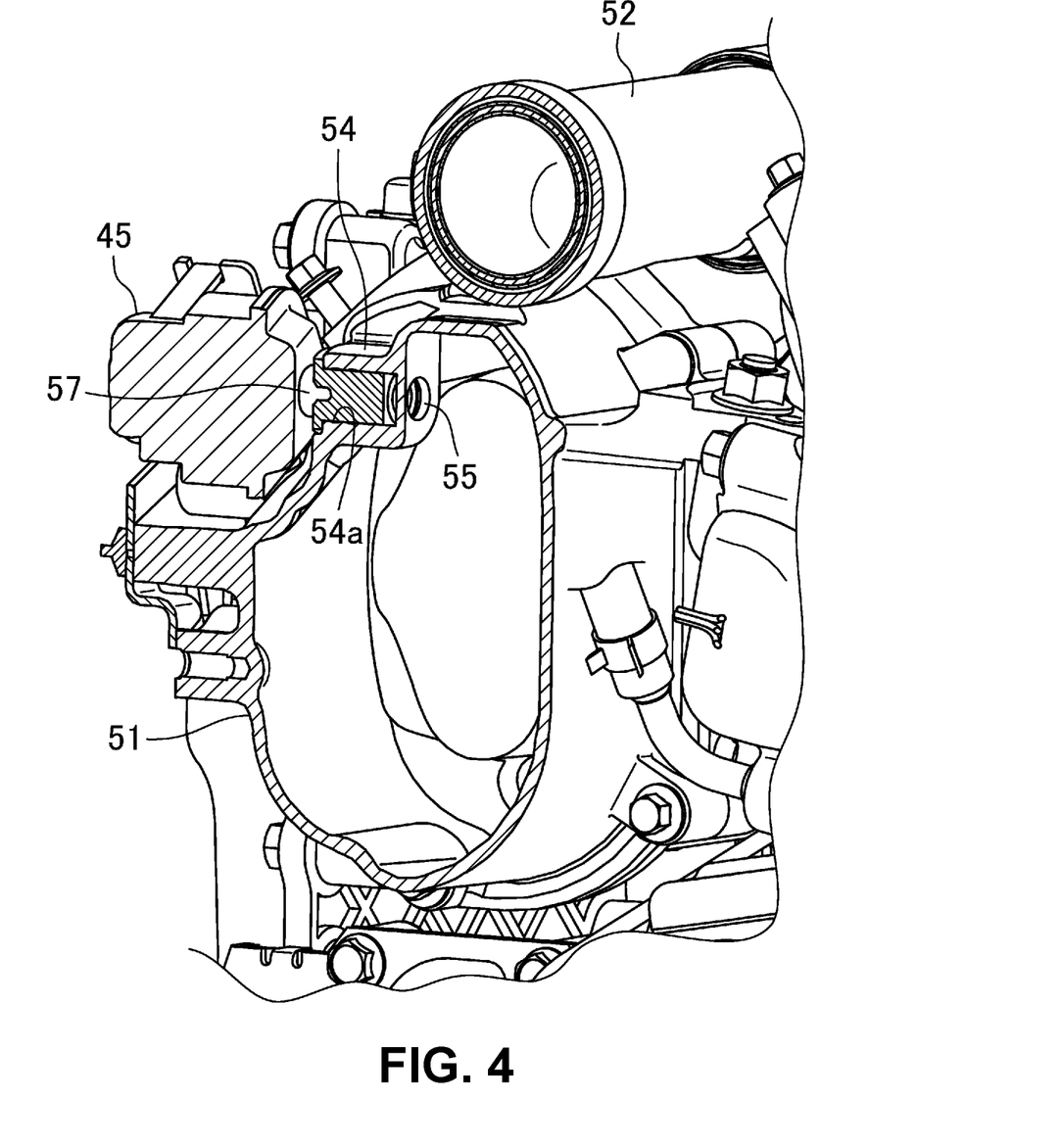
FIG. 4 is a perspective view illustrating the mount structure of the purge control valve, in which a part thereof is indicated by a cross section.

As illustrated in FIG. 4, the connection portion 54 is provided on the side portion of the upper end portion of the main air intake pipe 51. An evaporated fuel vapor inlet 55 is opened in the main air intake pipe 51 in the back portion of the connection port of the connection portion 54. The purge control valve 45 is provided with an evaporated fuel outflow connection pipe 57 that projects from a valve main body 56. The outflow connection pipe 57 is inserted into the connection port 54a of the connection portion 54 of the main air intake pipe 51. That is, the purge control valve 45 is directly connected to the main air intake pipe 51 without intervention of a purge hose. As is clear from FIG. 4, the bypass air intake pipe 52 branches from a portion of the main air intake pipe 51 on the upstream side of the connection portion 54 of the purge control valve 45, that is, a portion on the upstream side of the evaporated fuel intake 55. It should be noted here that the internal mechanism of the valve body of the purge control valve 45 is omitted by hatching it in FIG. 4.

Figure 5:
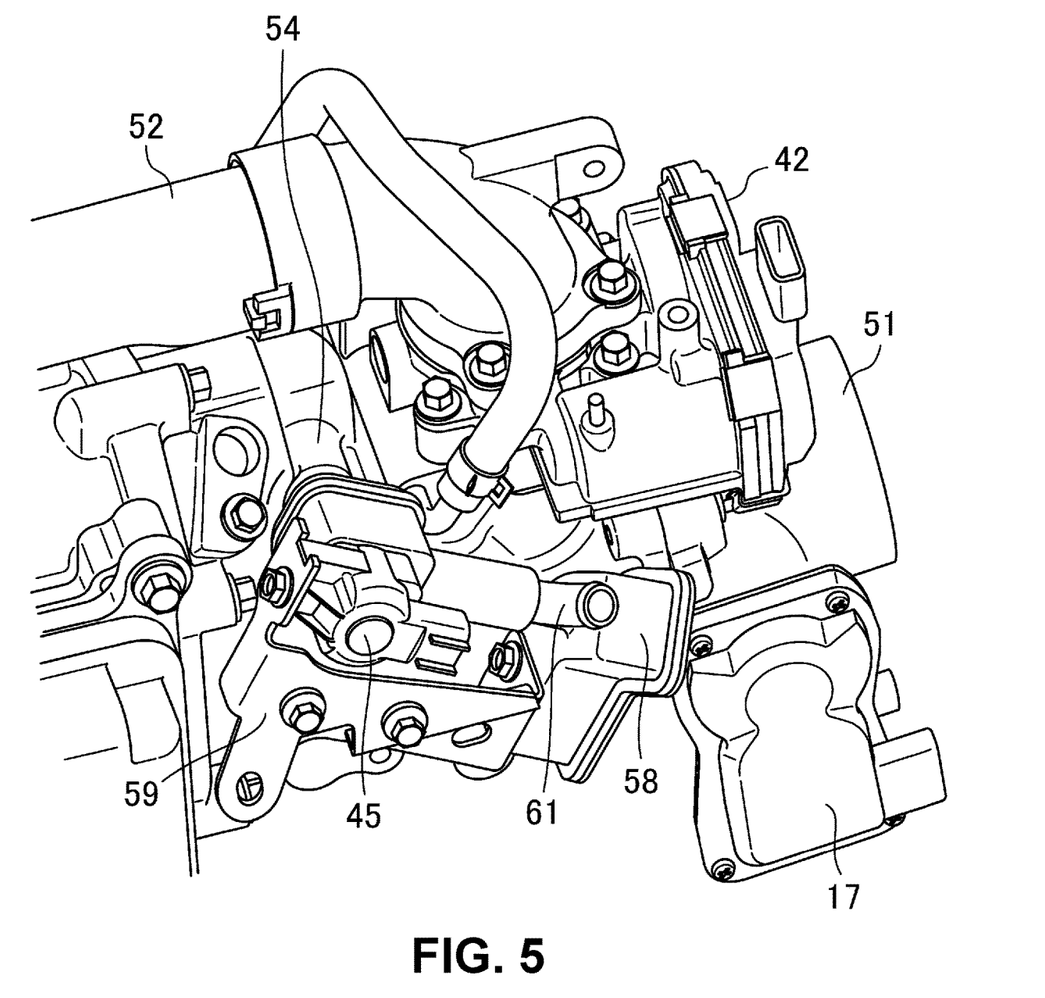
FIG. 5 is a perspective view illustrating the mount structure of the purge control valve.

As illustrated in FIG. 5, a bracket 59 for supporting the purge control valve 45 and a resonator (muffler) 58 is fixed to the cylinder head 7. The resonator 58 reduces the operation noise of the purge control valve 45. A hose connection pipe 61 for inflow of evaporated fuel branches from a pipe connecting the purge control valve 45 and the resonator 58. A hose for evaporated fuel extending from the canister 44 is connected to the hose connection pipe 61.

As is clear from FIG. 2, in the above structure, the purge control valve 45 is present in front of the intake pipes 51 and 52 and the fuel system components 39 and 53 are disposed on the opposite side of the purge control valve 45 across the intake pipes 51 and 52 in vehicle front view.

Figure 6:
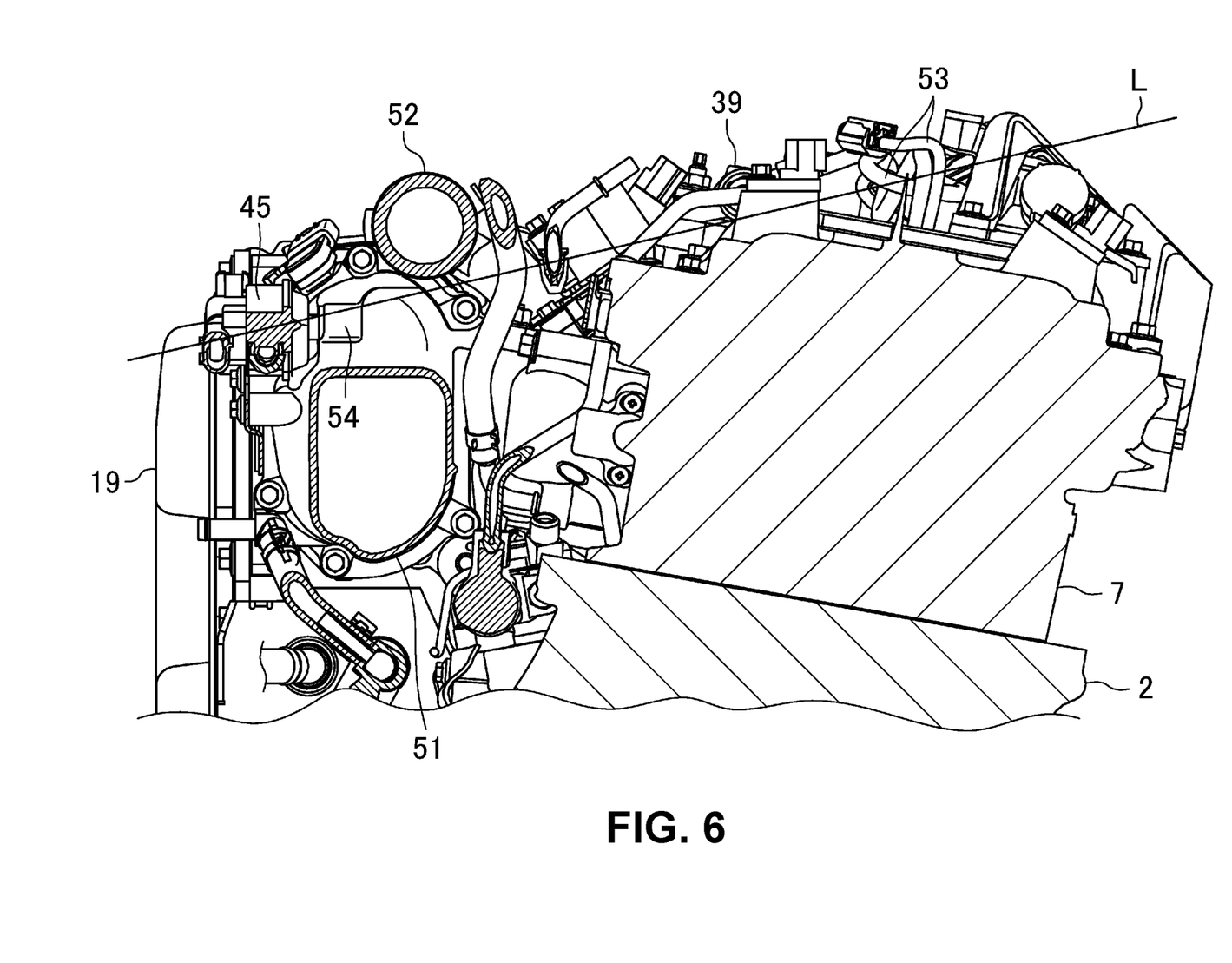
FIG. 6 is a side view illustrating an upper portion of the engine, in which a part thereof is indicated by a cross section.

As illustrated in FIG. 6, in side view of the engine 1, the intake pipes 51 and 52 are disposed on a line L linearly connecting the purge control valve 45 and the fuel system parts 39 and 53. In other words, in the collision direction during a front collision of the vehicle, the purge control valve 45 faces the fuel system parts 39 and 53 across the intake pipes 51 and 52 and the intake pipes 51 and 52 are present between the purge control valve 45 and the fuel system components 39 and 53. In addition, in the side view described above, the bypass air intake pipe 52 is present above the main air intake pipe 51 and present between the purge control valve 45 and the fuel system components 39 and 53 so as to project upward from the line L described above. It should be noted here that the internal structures of the cylinder block 2 and the cylinder head 7 are omitted by hatching them in FIG. 6.

<About Purging of Evaporated Fuel to the Intake Passage>

Since the purge control valve 45 is directly connected to the main air intake pipe 51 without intervention of an evaporated fuel hose as described above, evaporated fuel is responsively supplied to the intake passage 15 by the operation of the purge control valve 45.

Although the purge control valve 45 is directly connected to the main air intake pipe 51 in the embodiment described above, the present disclosure does not exclude connection of the purge control valve 45 to the main air intake pipe 51 via an evaporated fuel hose. Also in the case in which both are connected via an evaporated fuel hose, since the evaporated fuel hose can be shortened when the purge control valve 45 is disposed in front of the main air intake pipe 51, the response of purging is high.

In addition, since the evaporated fuel vapor inlet 55 is opened in a portion of the main air intake pipe 51 on the upstream side of the supercharger 18 and the bypass air intake pipe 52 branches from a portion of the main air intake pipe 51 on the upstream side of the evaporated fuel vapor inlet 55, the suction force of intake air by the supercharger 18 can be used to purge the evaporated fuel when the supercharger 18 operates. Therefore, desired purge efficiency can be obtained even when the throttle valve 17 is fully open.

<Protection of the Fuel System Component from the Purge Control Valve During the Front Collision of the Vehicle>

Even when a force is applied to the purge control valve 45 during the front collision of the vehicle so as to remove the purge control valve 45 from the bracket 59 and throw the purge control valve 45 backward, since the intake pipes 51 and 52 are present in front of the fuel system components 39 and 53, the purge control valve 45 can be prevented from colliding with the fuel system components 39 and 53 and damaging the fuel system components 39 and 53. In particular, since the bypass air intake pipe 52 is provided so as to project upward as viewed from the purge control valve 45, even when the purge control valve 52 thrown obliquely upward during the collision, the purge control valve 52 can be prevented from colliding with the fuel system components 39 and 53 since the purge control valve 52 hits the bypass air intake pipe 52.

In addition, even when the purge control valve 45 is pushed toward the fuel system components 39 and 53 due to the collision of the vehicle, the intake pipes 51 and 52 are deformed to absorb a shock. That is, the intake pipes 51 and 52 function as cushions and prevent the fuel system components 39 and 53 from being damaged.

OTHER EMBODIMENTS

Although the embodiment described above relates to a front intake rear exhaust horizontal engine, the intake pipes, the fuel system components, and the purge control valve may have the same disposition structure as in the embodiment described above from the viewpoint of protection of the fuel system components during a side collision of the vehicle also in a vertical engine in which the cylinder array direction is aligned with the vehicle front-rear direction. That is, in vehicle side view, the purge control valve is disposed in front of the intake pipes, the fuel system components are disposed on the opposite side of the purge control valve across the intake pipes, and the intake pipes are present between the purge control valve and the fuel system components.

Since such a disposition structure is adopted, even if the purge control valve is removed during a side collision of the vehicle from the side on which the purge control valve is installed, the intake pipes prevent the purge control valve from colliding with the fuel system components. Alternatively, even if the purge control valve is pushed toward the fuel system components due to the collision of the vehicle, the intake pipes function as cushions and prevent the fuel system components from being damaged.

What is claimed is:

1. An engine comprising:
a fuel system component provided on a cylinder head;
a purge control valve configured to control an amount of evaporated fuel purged from a canister to a portion of an intake passage on a downstream side of a throttle valve; and
an intake pipe that forms the portion of the intake passage on the downstream side of the throttle valve, the intake pipe extending in a cylinder array direction,
wherein the purge control valve is disposed in front of the intake pipe and the fuel system component is disposed on an opposite side of the purge control valve across the intake pipe in vehicle front view or vehicle side view.

2. The engine according to claim 1, wherein
the intake pipe that forms the portion of the intake passage on the downstream side of the throttle valve includes
a main air intake pipe that is connected to a supercharger and extends in the cylinder array direction, and
a bypass air intake pipe that branches from the main air intake pipe to bypass the supercharger and extends in the cylinder array direction,
the bypass air intake pipe extends in the cylinder array direction above the main air intake pipe, and
the purge control valve is provided to purge the evaporated fuel into the main air intake pipe.

3. The engine according to claim 2, wherein
an evaporated fuel vapor inlet related to the purge control valve is opened in a portion of the main air intake pipe on an upstream side of the supercharger, and
the bypass air intake pipe branches from a portion of the main air intake pipe on the upstream side of the evaporated fuel vapor inlet and is connected to the main air intake pipe on the downstream side of the supercharger.

4. The engine according to claim 3, wherein
the evaporated fuel vapor inlet is opened in an upper portion of the intake pipe that forms the portion of the intake passage on the downstream side of the throttle valve.

5. The engine according to claim 4, wherein
the purge control valve has an outflow connection pipe projecting from a valve body, and
the outflow connection pipe is directly connected to the intake pipe that forms the portion of the intake passage on the downstream side of the throttle valve.

6. The engine according to claim 3, wherein
the purge control valve has an outflow connection pipe projecting from a valve body, and
the outflow connection pipe is directly connected to the intake pipe that forms the portion of the intake passage on the downstream side of the throttle valve.

7. The engine according to claim 2, wherein
the evaporated fuel vapor inlet is opened in an upper portion of the intake pipe that forms the portion of the intake passage on the downstream side of the throttle valve.

8. The engine according to claim 7, wherein
the purge control valve has an outflow connection pipe projecting from a valve body, and
the outflow connection pipe is directly connected to the intake pipe that forms the portion of the intake passage on the downstream side of the throttle valve.

9. The engine according to claim 2, wherein
the purge control valve has an outflow connection pipe projecting from a valve body, and
the outflow connection pipe is directly connected to the intake pipe that forms the portion of the intake passage on the downstream side of the throttle valve.

10. The engine according to claim 1, wherein
the evaporated fuel vapor inlet is opened in an upper portion of the intake pipe that forms the portion of the intake passage on the downstream side of the throttle valve.

11. The engine according to claim 10, wherein
the purge control valve has an outflow connection pipe projecting from a valve body, and
the outflow connection pipe is directly connected to the intake pipe that forms the portion of the intake passage on the downstream side of the throttle valve.

12. The engine according to claim 1, wherein
the purge control valve has an outflow connection pipe projecting from a valve body, and
the outflow connection pipe is directly connected to the intake pipe that forms the portion of the intake passage on the downstream side of the throttle valve.

* * * * *